No. 803,306. PATENTED OCT. 31, 1905.
W. N. PRIAULX & R. MAURICE.
APPARATUS FOR GROWING CROPS.
APPLICATION FILED SEPT. 19, 1902.
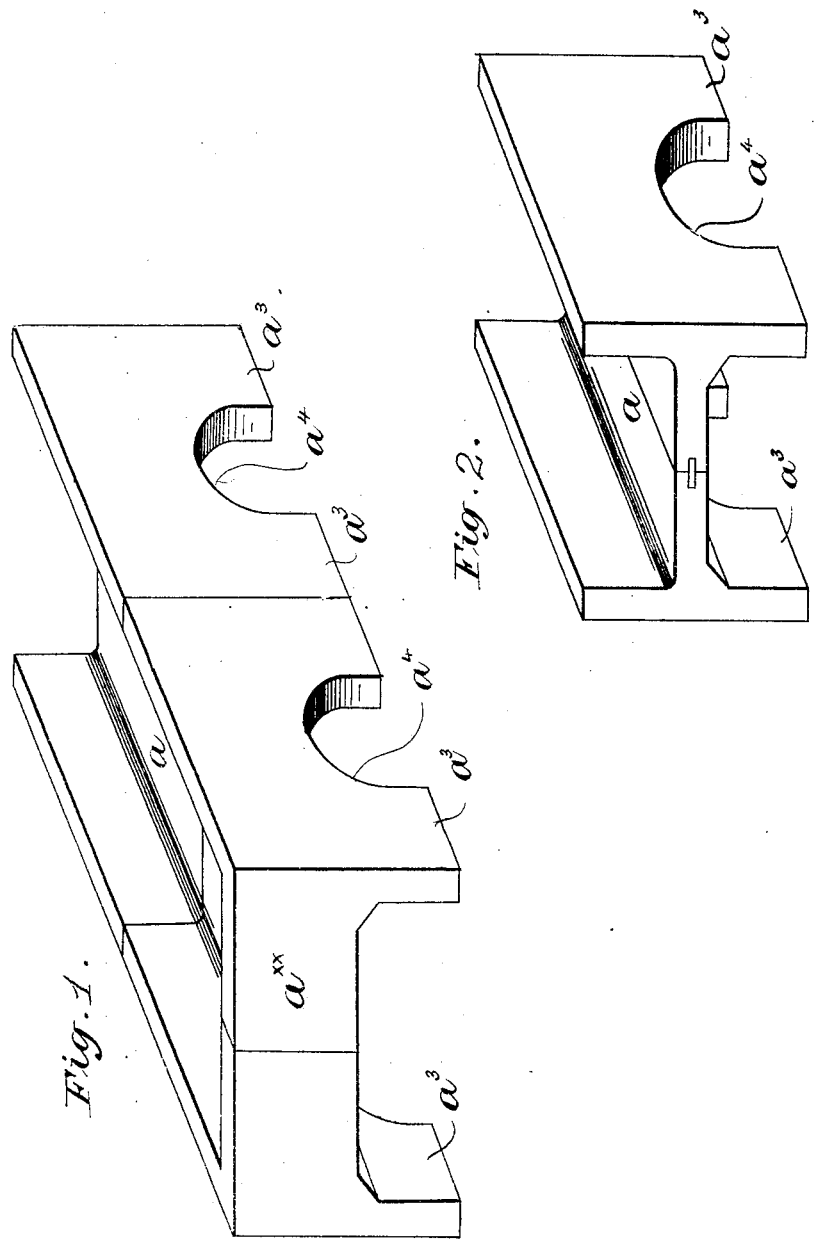

UNITED STATES PATENT OFFICE.

WILLIAM N. PRIAULX, OF AVONDALE, AND RICHARD MAURICE, OF SAINTS, ISLE OF GUERNSEY.

APPARATUS FOR GROWING CROPS.

No. 803,306. Specification of Letters Patent. Patented Oct. 31, 1905.

Application filed September 19, 1902. Serial No. 124,017.

*To all whom it may concern:*

Be it known that we, WILLIAM NICHOLAS PRIAULX, residing at Avondale, Forest parish, and RICHARD MAURICE, residing at Saints, St. Martins, Guernsey, Channel Islands, subjects of the King of Great Britain, have invented new or Improved Means or Apparatus for Growing Crops, of which the following is a specification.

This invention relates to an apparatus for growing crops, such as used either in greenhouses or in the open, and has among its objects the provision of a device which can be readily built up to any desired capacity, in which the several parts can be readily replaced when necessary, and which is so constructed as to permit the placing thereof over hot-water pipes and to insure the proper ventilation of the same.

With these and other ends in view the invention consists in the novel features and combinations of parts to be hereinafter described and claimed.

In the accompanying drawings, Figure 1 is a perspective view of one end portion of the apparatus, and Fig. 2 is a similar perspective view of one of the sections from which the complete apparatus is built up.

Similar characters of reference indicate corresponding parts throughout the views.

Referring to the drawings, $a$ designates a trough consisting of sections which abut each other at each end, these sections being of any desired number, so that the trough can be built up to any length desired. Each of said sections, one of which is shown in Fig. 2, is longitudinally divided into two parts provided intermediately of the height thereof with inwardly-extending offsets $a'$ $a^2$, cemented or otherwise suitably connected at their inner edges, as shown. In the lower side wall of each part $a'$ $a^2$ is formed a recess $a^4$ in order to permit the circulation of air beneath the trough. The provision of said recesses thus causes a number of legs $a^3$ to be formed, upon which legs the trough is supported at points throughout its length.

When the sections have been made up into a trough approximately of the desired length, end sections are added. These are also divided longitudinally and formed in substantially the same manner as the other sections, except that they are provided with transverse end walls $a^{xx}$, extending across the upper portion of each section, the lower portion being cut away to form a passage for hot-water pipes when it is desired to extend the same beneath the trough.

The improved trough is preferably made from a mixture of cement of the desired porosity. In the cement is preferably incorporated a slowly-soluble plant-food, such as basic slag or some other form of inorganic manure, which is assimilable by the plants growing in the trough. As the trough is preferably made of cement, it is practically unbreakable, and the expense of frequent renewal is thus obviated.

The use of our improved trough permits a varied arrangement of the same—for instance, continuing the troughs along the whole length of the greenhouse, affording thereby the best conditions for preventing overwatering, which is furthermore prevented by the porosity of the trough itself. Owing to the provision of the ventilating-openings and to the fact that the trough is porous, air can pass through the soil and the trough in all directions, thus keeping it perfectly "sweet" in a manner which has not been attained heretofore.

Having thus described our invention, we claim as new and desire to secure by Letters Patent—

1. An apparatus for growing crops comprising a plurality of abutting trough-shaped intermediate and end sections, each of said sections being longitudinally divided into two parts having inwardly-extending offsets intermediate of their height, and means for connecting the offsets of the corresponding parts.

2. An apparatus for growing crops comprising a plurality of abutting trough-shaped intermediate and end sections, each of said sections being longitudinally divided into two parts having inwardly-extending offsets intermediate of their height, and means for connecting the corresponding longitudinally-divided parts, said parts having recesses therein which form legs for supporting said intermediate and end sections.

In witness whereof we have hereunto set our hands in presence of two witnesses.

WILLIAM N. PRIAULX.
RICHARD MAURICE.

Witnesses:
HERBERT A. LE PATOUREL,
PETER J. MAUGER.